United States Patent
Osawa et al.

(10) Patent No.: US 9,383,188 B2
(45) Date of Patent: Jul. 5, 2016

(54) POLARIZATION-SENSITIVE OPTICAL MEASUREMENT INSTRUMENT

(71) Applicant: Hitachi-Lg Data Storage, Inc., Tokyo (JP)

(72) Inventors: Kentaro Osawa, Tokyo (JP); Tatsuro Ide, Tokyo (JP); Masaki Mukoh, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 150 days.

(21) Appl. No.: 14/083,599

(22) Filed: Nov. 19, 2013

(65) Prior Publication Data

US 2014/0152996 A1 Jun. 5, 2014

(30) Foreign Application Priority Data

Dec. 4, 2012 (JP) ................................. 2012-265630

(51) Int. Cl.
*G01B 9/02* (2006.01)

(52) U.S. Cl.
CPC ........ *G01B 9/02091* (2013.01); *G01B 9/02081* (2013.01); *G01B 2290/45* (2013.01); *G01B 2290/70* (2013.01)

(58) Field of Classification Search
CPC .................................................. G01B 9/02091
See application file for complete search history.

(56) References Cited

U.S. PATENT DOCUMENTS

| 4,886,363 | A * | 12/1989 | Jungquist ...................... 356/487 |
| 2006/0100490 | A1* | 5/2006 | Wang et al. ................... 600/310 |
| 2010/0045956 | A1* | 2/2010 | Van De Kerkhof et al. .... 355/71 |
| 2012/0257210 | A1* | 10/2012 | Whitney et al. ............... 356/479 |

FOREIGN PATENT DOCUMENTS

JP 2004-28970 1/2004

OTHER PUBLICATIONS

Medical Photonics No. 1, p. 29-33.
Medical Photonics No. 7, p. 58-64.

* cited by examiner

*Primary Examiner* — Tarifur Chowdhury
*Assistant Examiner* — Omar Nixon
(74) *Attorney, Agent, or Firm* — Baker Botts L.L.P.

(57) ABSTRACT

A beam emitted from a light source is split into a probe beam that irradiates a measurement object and a reference beam that does not irradiate the measurement object. A signal beam obtained by the reflection of the probe beam is split into first and second split signal beams, which are mutually orthogonal polarized components. The first split signal beam and the reference beam are inputted to a first coherence optical system to cause the beams to interfere with each other to generate at least three coherence beams differing in phasic relationship. The second split signal beam and the reference beam are inputted to a second coherence optical system to cause the beams to interfere with each other to generate at least three coherence beams differing in phasic relationship. The coherence beams are then detected.

9 Claims, 8 Drawing Sheets

F I G. 1
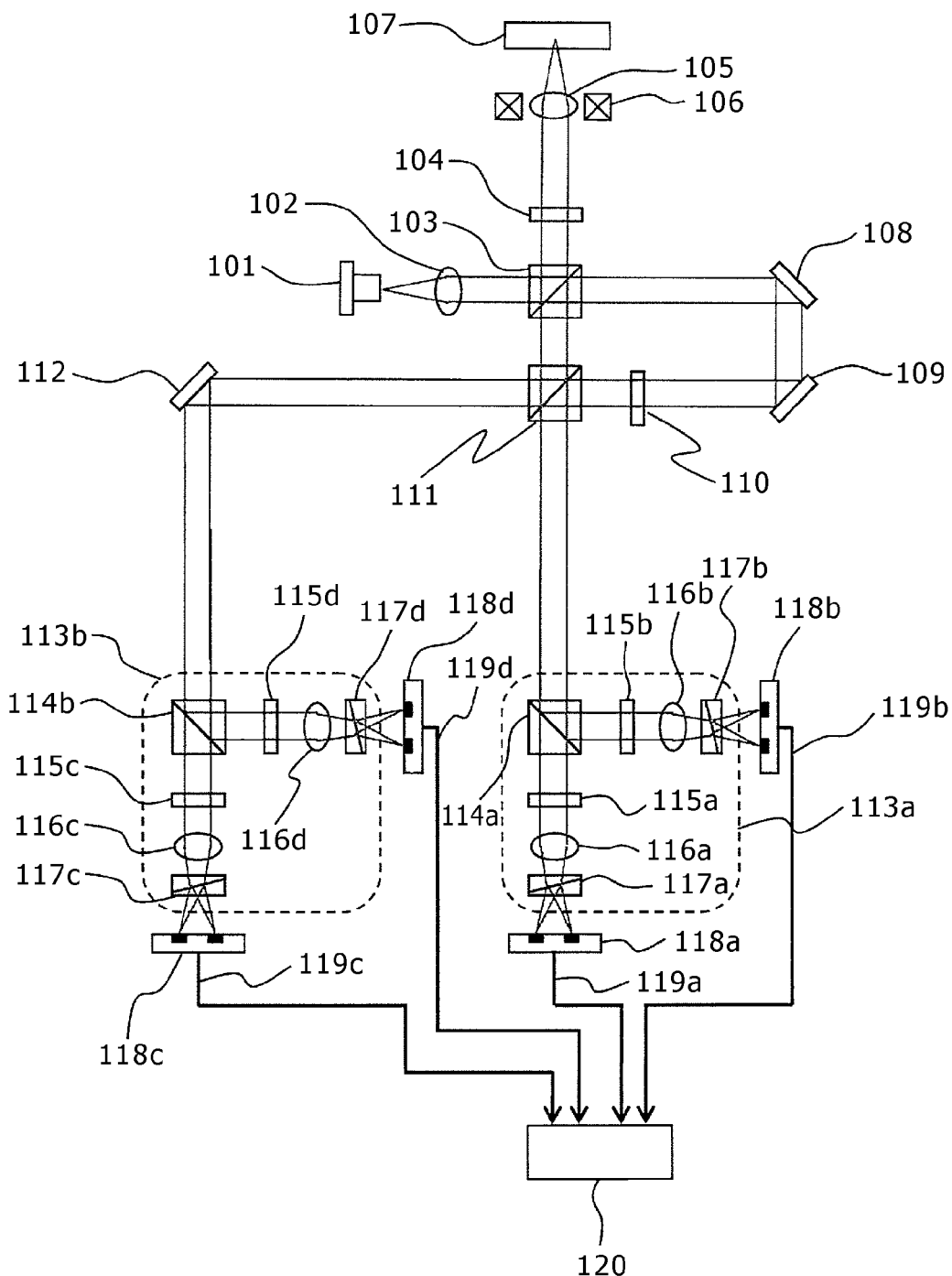

POLARIZATION-SENSITIVE OPTICAL MEASUREMENT INSTRUMENT

CLAIM OF PRIORITY

The present application claims priority from Japanese patent application JP 2012-265630 filed on Dec. 4, 2012, the content of which is hereby incorporated by reference into this application.

BACKGROUND

The present invention relates to a polarization-sensitive optical measurement instrument.

In recent years, optical coherence tomography (OCT) by which light is used for acquiring images reflecting the surface structure and the internal structure of the object of measurement is attracting note (Medical Photonics No. 1 (2010), pp. 29-33 (Non-patent document 1) and Medical Photonics No. 7 (2011), pp. 58-64 (Non-patent document 2)). OCT, as it is non-invasive to human bodies, is expected to be safely applicable to medical and biological purposes. In the ophthalmologic field, in particular, apparatuses for forming images of eye ground and cornea among others are already in the stage of practical use.

A living tissue may sometimes be birefringent. For instance, the crystalline lens of a human eyeball has a laminar structure formed of a plurality of layers, differing in birefringent direction from one another, one stacked over another. However, as these layers are the same in refractive index, conventional OCT, by which the refractive index of the living tissue is measured, cannot visualize their structure. As a technique to visualize such a structure, polarization-sensitive OCT has been developed (Japanese Unexamined Patent Application Publication No. 2004-28970 (Patent document 1)).

SUMMARY

Any known polarization-sensitive OCT apparatus, such as the one disclosed in Patent document 1 requires four different polarized states of a probe beam to be brought to incidence on an object of measurement to acquire information on the polarization (Mueller matrix) of the object and another four different states of a reference beam, eventually necessitating 16 times of measuring.

According to the present invention, a beam emitted from a light source is branched with an optical splitting device into a measurement object and a reference beam that does not irradiate the measurement object; the polarized state of the probe beam is adjusted to a p-polarized state or an s-polarized state with a polarization adjusting device, such as a $\lambda/2$ plate; three or more coherence beams differing in phasic relationship from one another are generated from the p-polarized component and the reference beam with a first coherence optical system; three or more coherence beams differing in phasic relationship from one another are generated from the s-polarized component and the reference beam with a second coherence optical system; the coherence beams generated with the first coherence optical system are detected with a first detecting device; and the coherence beams generated with the second coherence optical system are detected with a second detecting device.

As the absolute values of the amplitudes of the p-polarized beam component and the s-polarized beam of the signal beam electric field can be acquired by measuring only once, information on the polarization of the measurement object can be obtained by fewer measurements than by any known method.

By providing a probe beam scanning device and acquiring information on the polarization of the measurement object while scanning the position of irradiation of the measurement object with the probe beam, a one-dimensional image along the testing line of the object of test or a two-dimensional image of the tested face can be acquired. The probe beam scanning device can be configured by using a Galvano mirror or an actuator for driving an object lens.

In another way of implementing the invention, the number of coherence beams generated by the first coherence optical system or the number of coherence beams generated by the second coherence optical system is four; the four coherence beams differ in the phase of coherence from one another by approximately 90 degrees each, and a pair of coherence beams differing in phase by approximately 180 degrees are detected by a differential detector of a current differential type.

As this configuration makes it difficult for the detector to become saturated, it is made possible to increase the intensity of the reference beam and therefore to secure a high S/N ratio.

In another way of implementing the invention, an optical observation unit having an optical splitting device, a polarization adjusting device and a polarized beam separating device and an optical detection unit having a light source, first and second coherence optical systems and first and second detecting devices are connected by two or more detachable polarization maintaining optical fibers.

As, in this way, it is made possible to bring only the optical observation unit close to the measurement object when a large measurement object, such as a human body, is to be measured, and the measuring action is correspondingly facilitated.

In another way of implementing the invention, the optical splitting device and the polarization adjusting device are realized in a single polarized beam separating element, and the signal beam and the reference beam having returned toward the light source are guided to the first coherence optical system or the second coherence optical system by a return beam utilizing device, such as an optical circulator.

In this way, the number of components of the optical measurement instrument can be reduced, and the signal beam and the reference beam can be multiplexed in a simpler configuration.

In another way of implementing the invention, the first coherence optical system and the second coherence optical system are realized in a single coherence optical system.

In this way, the number of components of the optical measurement instrument can be further reduced.

In another way of implementing the invention, the first detecting device and the second detecting device make up one and the same detecting device, and an optical switch-over device, such as an optical switch or an optical shutter, is used to differentiate from each other the time range in which the coherence beam generated by the first coherence optical system is brought to incidence on the detecting device and the time range in which the coherence beam generated by the second coherence optical system is brought to incidence on the detecting device.

In this way, the number of detectors of the optical measurement instrument can be further reduced.

According to the invention, it is possible to provide a polarization-sensitive optical measurement instrument that can acquire information on the polarization of an object by measuring a smaller number of times than by any known technique.

Other problems, configurations and advantageous effects of the invention will become apparent from the description of exemplary embodiments thereof when taken in conjunction with the accompanying drawings.

BRIEF DESCRIPTION OF THE DRAWINGS

FIG. 1 shows an example of optical measurement instrument according to the invention;

DETAILED DESCRIPTION

Figure 2:
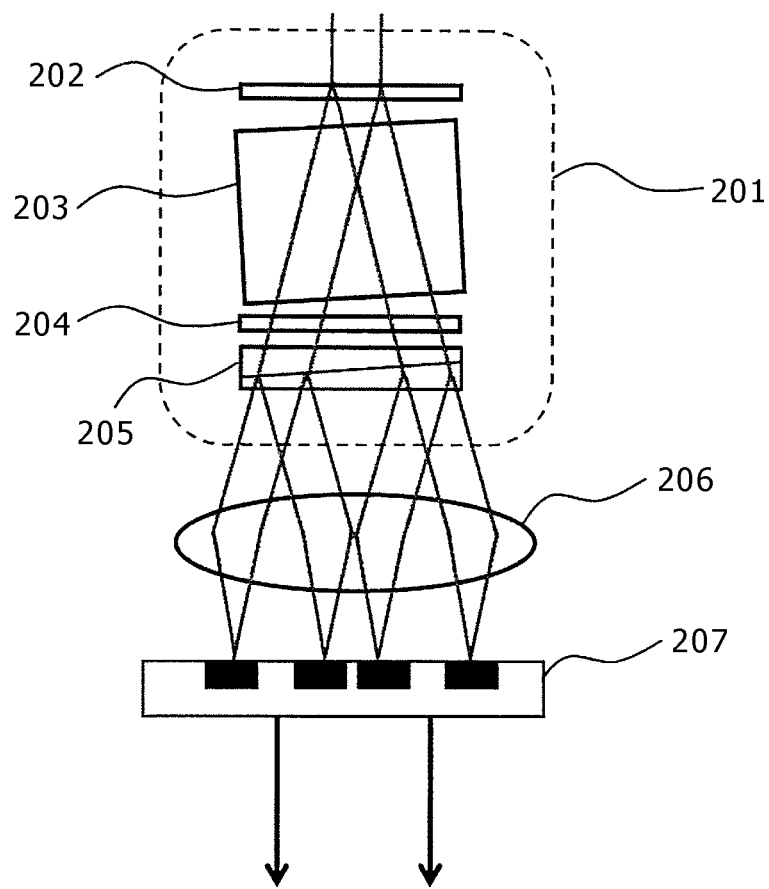
FIG. 2 shows an example of coherence optical system used in the invention.

Exemplary embodiments of the invention will be described in detail below with reference to the accompanying drawings.

First Embodiment

FIG. 1 is a schematic diagram showing a basic embodiment of the invention.

A beam emitted from a light source 101, after being converted by a collimate lens 102 into a parallel beam, is branched by a half beam splitter 103 into two beams including a probe beam and a reference beam. The probe beam, after being adjusted into a p-polarized beam or an s-polarized beam by a λ/2 plate 104, whose crystal orientation is adjustable, is focused by an object lens 105 and irradiates a measurement object 107. Here, the position of focus on the measurement object is scanned by moving the position of the object lens 105 with an actuator 106. The probe beam (hereinafter referred to as signal beam) reflected by the measurement object is converted by the object lens 105 into a parallel beam, and transmitted by the λ/2 plate 104 and the half beam splitter 103 to be guided to a polarized beam splitter 111. The intensity of the signal beam is halved when the beam is transmitted by the half beam splitter 103.

On the other hand, the reference beam, after being reflected by a mirror 108 and a mirror 109, is converted in its polarized state by a λ/2 plate 110 into a 45-degree linearly polarized beam, which is brought to incidence on the polarized beam splitter 111.

The p-polarized beam component of the signal beam and the s-polarized beam component of the reference beam at the time of incidence on the polarized beam splitter 111 are multiplexed by the polarized beam splitter 111 to become a first synthesized beam. The first synthesized beam is guided to a first coherence optical system 113a comprising a half beam splitter 114a, a λ/2 plate 115a, a λ/4 plate 115b, focusing lenses 116a and 116b, and Wollaston prisms 117a and 117b. Similarly, the p-polarized beam component of the signal beam and the s-polarized beam component of the reference beam at the time of incidence on the polarized beam splitter 111 are multiplexed by the polarized beam splitter 111 to become a second synthesized beam. The second synthe-sized beam, after being reflected by a mirror 112 is guided to a second coherence optical system 113b comprising a half beam splitter 114b, a λ/2 plate 115c, a λ/2 plate 115d, focusing lenses 116c and 116d, and Wollaston prisms 117c and 117d.

As the first the coherence optical system 113a and a second coherence optical system 113b are the same in structure, the following description will concern only the first coherence optical system.

The first synthesized beam coming incident on the first the coherence optical system 113a is split into two beams, including a transmitted beam and a reflected beam, by the half beam splitter 114a. The transmitted beam of the first synthesized beam, after being transmitted by the λ/2 plate 115a whose optical axis is set at about 22.5 degrees to the horizontal direction, is focused by the focusing lens 16a and at the same time split into two by the Wollaston prism 117a to generate a first coherence beam and a second coherence beam differing by 180 degrees in mutual phasic relationship, which are detected by a current differential type detector 18a to output a signal 119a proportional to the intensity difference between the two coherence beams to achieve splitting into the transmitted beam and the reflected beam.

The reflected beam of the first synthesized beam, after being transmitted by the λ/4 plate 115b whose optical axis is set at about 45 degrees to the horizontal direction, is focused by the focusing lens 16b and at the same time split into two by the Wollaston prism 117b to generate a third coherence beam and a fourth coherence beam differing by 180 degrees in mutual phasic relationship, which are detected by a current differential type detector 118b to output a signal 119b proportional to the intensity difference between the two coherence beams.

Similarly, the four coherence beams generated from the second coherence beam by the second coherence optical system 113b are detected by detectors 118c and 118d to generate a signal 119c and a signal 119d.

The signals 119a, 119b, 119c and 119d generated in this way are inputted to a signal processor 120, in which they are put to arithmetic operation to visualize the polarization information (Mueller matrix) on the measurement object.

In the following paragraphs, the principle of figuring out the Mueller matrix of the measurement object with the optical measurement instrument of this embodiment will be described by using mathematical expressions.

First, a method to figure out the Jones vector of the signal beam will be described.

The Jones vectors of the signal beam and the reference beam at the time of coming incident on the polarized beam splitter 111 (hereinafter referred to as the signal beam and the reference beam, respectively) can be expressed as follows.

[Mathematical expression 1]

$$\begin{pmatrix} E_{sig}^{(p)} \\ E_{sig}^{(s)} \end{pmatrix} \quad (1)$$

$$\begin{pmatrix} E_{ref} \\ E_{ref} \end{pmatrix} \quad (2)$$

Here, $E_{sig}^{(p)}$ and $E_{sig}^{(s)}$ are the p-polarized beam component and the s-polarized beam component, respectively, of a signal beam electric field.

As the reference beam is a 45-degree linearly polarized beam, the p-polarized beam component and the s-polarized beam component are equal to each. Then, the Jones vectors of the first synthesized beam and the second synthesized beam can be represented respectively as follows.

[Mathematical expression 2]

$$\begin{pmatrix} E_{sig}^{(p)} \\ E_{ref} \end{pmatrix} \quad (3)$$

$$\begin{pmatrix} E_{ref} \\ E_{sig}^{(s)} \end{pmatrix} \quad (4)$$

As the process in which the four coherence beams are formed from the first synthesized beam and that in which the four coherence beams are formed from the second synthesized beam are the same, only the process in which the four coherence beams are formed from the first synthesized beam will be described in the following paragraphs.

The Jones vector of the first synthesized beam transmitted by the half beam splitter 114a and further transmitted by the λ/2 plate 115a is as represented below.

[Mathematical expression 3]

$$\begin{pmatrix} 1/\sqrt{2} & -1/\sqrt{2} \\ 1/\sqrt{2} & 1/\sqrt{2} \end{pmatrix} \begin{pmatrix} E_{sig}^{(p)}/\sqrt{2} \\ E_{ref}/\sqrt{2} \end{pmatrix} = \frac{1}{2}\begin{pmatrix} E_{sig}^{(p)} - E_{ref} \\ E_{sig}^{(p)} + E_{ref} \end{pmatrix} \quad (5)$$

After being split into the p-polarized beam component and the s-polarized beam component by the Wollaston prism 117a, the first synthesized beam represented by Formula (5) is differentially detected by the detector 18a, and therefore the detection signal 119a is represented as follows.

[Mathematical expression 4]

$$I_1^{(p)} = \frac{1}{4}|E_{sig}^{(p)} + E_{ref}|^2 - \frac{1}{4}|E_{sig}^{(p)} - E_{ref}|^2 \quad (6)$$

$$= |E_{sig}^{(p)}||E_{ref}|\cos(\theta_{sig}^{(p)} - \theta_{ref})$$

Here, $\theta_{sig}^{(p)}$ and $\theta_{ref}$ are phases when complex numbers $E_{sig}^{(p)}$ and $E_{ref}$ are represented in a polar coordinates system. For the sake of simplicity, the conversion efficient of the detector is supposed to be 1.

On the other hand, the Jones vector of the first synthesized beam reflected by the half beam splitter 114a and further transmitted by the λ/4 plate 115b is as follows.

[Mathematical expression 5]

$$\begin{pmatrix} i/\sqrt{2} & 1/\sqrt{2} \\ 1/\sqrt{2} & i/\sqrt{2} \end{pmatrix} \begin{pmatrix} E_{sig}^{(p)}/\sqrt{2} \\ E_{ref}/\sqrt{2} \end{pmatrix} = \frac{1}{2}\begin{pmatrix} i(E_{sig}^{(p)} - iE_{ref}) \\ E_{sig}^{(p)} + iE_{ref} \end{pmatrix} \quad (7)$$

After being split into the p-polarized beam component and the s-polarized beam component by the Wollaston prism 117b, the first synthesized beam represented by Formula (7) is differentially detected by the detector 118b, and therefore the detection signal 119b is represented as follows.

[Mathematical expression 6]

$$I_2^{(p)} = \frac{1}{4}|E_{sig}^{(p)} + iE_{ref}|^2 - \frac{1}{4}|E_{sig}^{(p)} - iE_{ref}|^2 \quad (8)$$

$$= |E_{sig}^{(p)}||E_{ref}|\sin(\theta_{sig}^{(p)} - \theta_{ref})$$

By subjecting these outputs to the following arithmetic operation, a signal proportional to the absolute value of the amplitude of the p-polarized beam component of the signal beam is obtained.

[Mathematical expression 7]

$$|E_{sig}^{(p)}||E_{ref}| = \sqrt{(I_1^{(p)})^2 + (I_2^{(p)})^2} \quad (9)$$

Further by the following arithmetic operation, the phase of the p-polarized beam component of the signal beam, based on the phase of the reference beam as reference, can be acquired.

[Mathematical expression 8]

$$\theta_{sig}^{(p)} - \theta_{ref} = \begin{cases} \arctan(I_2^{(s)}/I_1^{(s)})(I_1^{(s)} > 0のとき) \\ \pi + \arctan(I_2^{(s)}/I_1^{(s)})(I_1^{(s)} < 0のとき) \end{cases} \quad (10)$$

In exactly the same way, the absolute value of the amplitude and the phase of the s-polarized beam component of the signal beam are acquired from the second synthesized beam. This procedure enables the absolute value of the amplitude and the phase of each polarized component of the signal beam, namely the Jones vector of the signal beam, to be obtained by single measuring only once.

Next, a method to figure out the Mueller matrix of the measurement object from the Jones vector of the obtained signal beam will be described.

The Jones vector of the signal beam is connected by the following relationship to the probe beam immediately after being transmitted by the λ/2 plate 104 (hereinafter referred to as simply probe beam).

[Mathematical expression 9]

$$E_{sig} = J_{HBS}J_{HWP}J_0E_0 \quad (11)$$

$$= JE_0$$

Here, $E_{sig}$ and $E_0$ are the Jones vectors of the signal beam and the probe beam, respectively; $J_{HWP}$, the Jones matrix of the λ/2 plate 104; $J_{HBS}$, the Jones matrix of the half beam splitter 103; $J_0$, the Jones matrix of the measurement object; and J, the Jones matrix of the whole.

From Formula (11), the Jones vectors of the signal beam when the polarized states of the probe beam are supposed to be the p-polarized beam and the s-polarized beam are represented as follows.

[Mathematical expression 10]

$$J\begin{pmatrix} 1 \\ 0 \end{pmatrix} = \begin{pmatrix} J_{11} & J_{12} \\ J_{21} & J_{22} \end{pmatrix}\begin{pmatrix} 1 \\ 0 \end{pmatrix} \quad (12)$$

$$= \begin{pmatrix} J_{11} \\ J_{21} \end{pmatrix}$$

-continued $$J\begin{pmatrix}0\\1\end{pmatrix}=\begin{pmatrix}J_{11}&J_{12}\\J_{21}&J_{22}\end{pmatrix}\begin{pmatrix}0\\1\end{pmatrix} \quad (13)$$
$$=\begin{pmatrix}J_{12}\\J_{22}\end{pmatrix}$$

It is seen here that the Jones matrix J of the whole can be obtained by figuring out the respective Jones vectors of the signal beam when the polarized states of the probe beam are supposed to be the p-polarized beam and the s-polarized beam. Since the optical measurement instrument of this embodiment can obtain the Jones vectors of the signal beam by a single measurement as stated above, the Jones matrix J of the whole can be acquired by a total of two measurements.

As both the Jones matrices $J_{HWP}$ and $J_{HBS}$ of the λ/2 plate 104 and the half beam splitter 103, respectively, can be measured in advance (or their designed values may be used as well), once the Jones matrix J of the whole is known, the Jones matrix of the measurement object can be figured out.

[Mathematical expression 11]

$$J_0 = (J_{HBS} J_{HWP})^{-1} J \quad (14)$$

By further performing the following arithmetic operation, the Mueller matrix $M_0$ of the measurement object can be figured out.

[Mathematical expression 12]

$$M_0=\begin{pmatrix}1&0&0&1\\1&0&0&-1\\0&1&1&0\\0&i&-i&0\end{pmatrix}(J\cdot J^*)\begin{pmatrix}1&0&0&1\\1&0&0&-1\\0&1&1&0\\0&i&-i&0\end{pmatrix}^{-1} \quad (15)$$

Here, ● represents the Kronecker tensor product.

In this way, this embodiment can obtain the Mueller matrix $M_0$ of the measurement object by fewer measurements than by any known method.

To add, as the first the coherence optical system 113a or the second coherence optical system 113b, a coherence optical system shown in FIG. 2 can be used, for instance, besides what is shown in FIG. 1. In the coherence optical system 201 shown in FIG. 2, a synthesized beam formed of a signal beam and a reference beam is first branched by a diffraction grating 202 into positively and negatively primary diffracted beams to generate a first synthesized beam and a second synthesized beam. These synthesized beams pass a phase plate 203 so arranged that the phase difference between the s-polarized beam component and the p-polarized beam component of the first synthesized beam and the phase difference between the s-polarized beam component and the p-polarized beam component of the second synthesized beam is 90 degrees. These coherence beams are focused by a focusing lens 206, and the pair of coherence beams 180 degrees different in phasic relationship are differentially detected by a detector 207. After that, the direction of polarization is turned by a λ/2 plate 204 set to about 22.5 degrees to the horizontal direction, followed by polarized separation by a Wollaston prism 205, and four coherence beams differing from one another by approximately 90 degrees to the phase of coherence are generated. These coherence beams are focused by the focusing lens 206, and the pair of coherence beams 180 degrees different in phasic relationship are differentially detected by a detector 207.

Further, while information on the amplitude and phase of each polarized component of the signal beam is acquired from the intensities of the four coherence beams in this embodiment, as three parameters including (1) the signal beam intensity, (2) the reference beam intensity and (3) the phase difference between the signal beam and the reference beam determine the coherence beam intensity, information on amplitude and phase can be acquired by detecting the intensities of the three coherence beams different in phase as a matter of principle.

Figure 3:
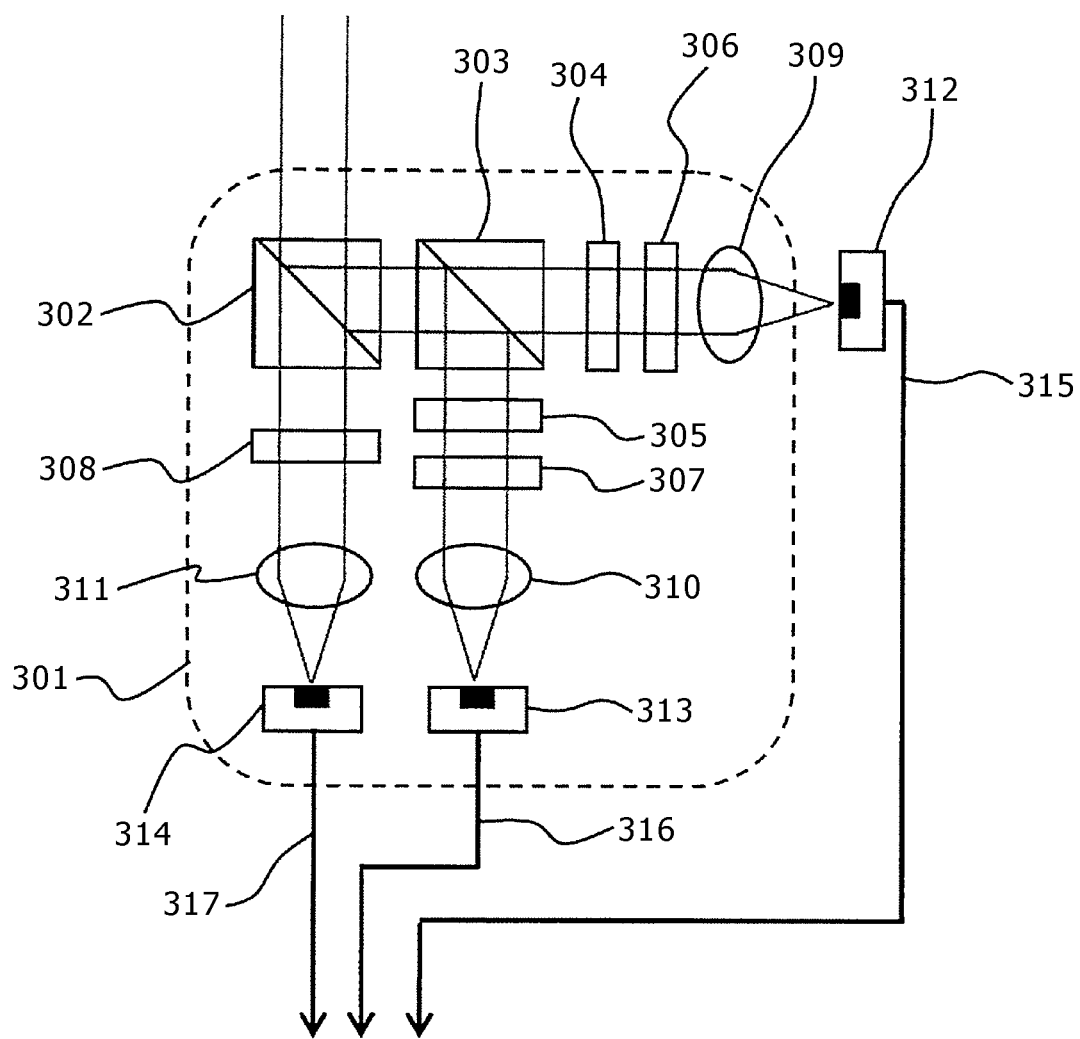
FIG. 3 shows another example of coherence optical system used in the invention.

For this reason, it is possible to use, for instance a coherence optical system 301 shown in FIG. 3 in place of the first the coherence optical system 113a or the second coherence optical system 113b. The function of the coherence optical system 301 will be described below. A signal beam is split by non-polarized beam splitters 302 and 303 into the first synthesized beam, the second synthesized beam and a third synthesized beam, of which the first synthesized beam passes a phase plate 304 that gives rise to a 120-degree phase difference between the s-polarized beam and the p-polarized beam and the second synthesized beam passes a phase plate 305 that gives rise to a 240-degree phase difference between the s-polarized beam and the p-polarized beam; all the three synthesized beams pass polarizers 306, 307 and 308 that transmit only 45-degree linearly polarized beams, focused by focusing lenses 309, 310 and 311, and detected by detectors 312, 313 and 314. The respective outputs 315, 316 and 317 of these detectors are represented as follows.

[Mathematical expression 13]

$$I_1 = \left|\frac{1}{\sqrt{3}} E_{sig}^{(p)} + \frac{1}{\sqrt{3}} E_{ref}\right| \quad (16)$$
$$= \frac{1}{3}|E_{sig}^{(p)}|^2 + \frac{1}{3}|E_{ref}|^2 + \frac{2}{3}|E_s||E_r|\cos(\theta_{sig}^{(p)} - \theta_{ref})$$

$$I_2 = \left|\frac{1}{\sqrt{3}} E_{sig}^{(p)} + \frac{1}{\sqrt{3}} e^{\frac{\pi}{3}i} E_{ref}\right| \quad (17)$$
$$= \frac{1}{3}|E_{sig}^{(p)}|^2 + \frac{1}{3}|E_{ref}|^2 + \frac{2}{3}|E_s||E_r|\cos(\theta_{sig}^{(p)} - \theta_{ref} - \frac{\pi}{3})$$

$$I_3 = \left|\frac{1}{\sqrt{3}} E_{sig}^{(p)} + \frac{1}{\sqrt{3}} e^{\frac{2\pi}{3}i} E_{ref}\right| \quad (18)$$
$$= \frac{1}{3}|E_{sig}^{(p)}|^2 + \frac{1}{3}|E_{ref}|^2 + \frac{2}{3}|E_s||E_r|\cos\left(\theta_{sig}^{(p)} - \theta_{ref} - \frac{2\pi}{3}\right)$$

By subjecting these outputs to the following arithmetic operation, information on the amplitude and phase of each polarized component can be obtained.

[Mathematical expression 14]

$$\theta_s - \theta_r = \frac{\sqrt{3}(I_2 - I_3)}{2I_1 - I_2 - I_3} \quad (19)$$

$$|E_s||E_r| = \sqrt{\left(I_1 - \frac{I_2 - I_3}{2}\right)^2 + 3\left(\frac{I_2 - I_3}{2}\right)^2} \quad (20)$$

Second Embodiment

Figure 4:
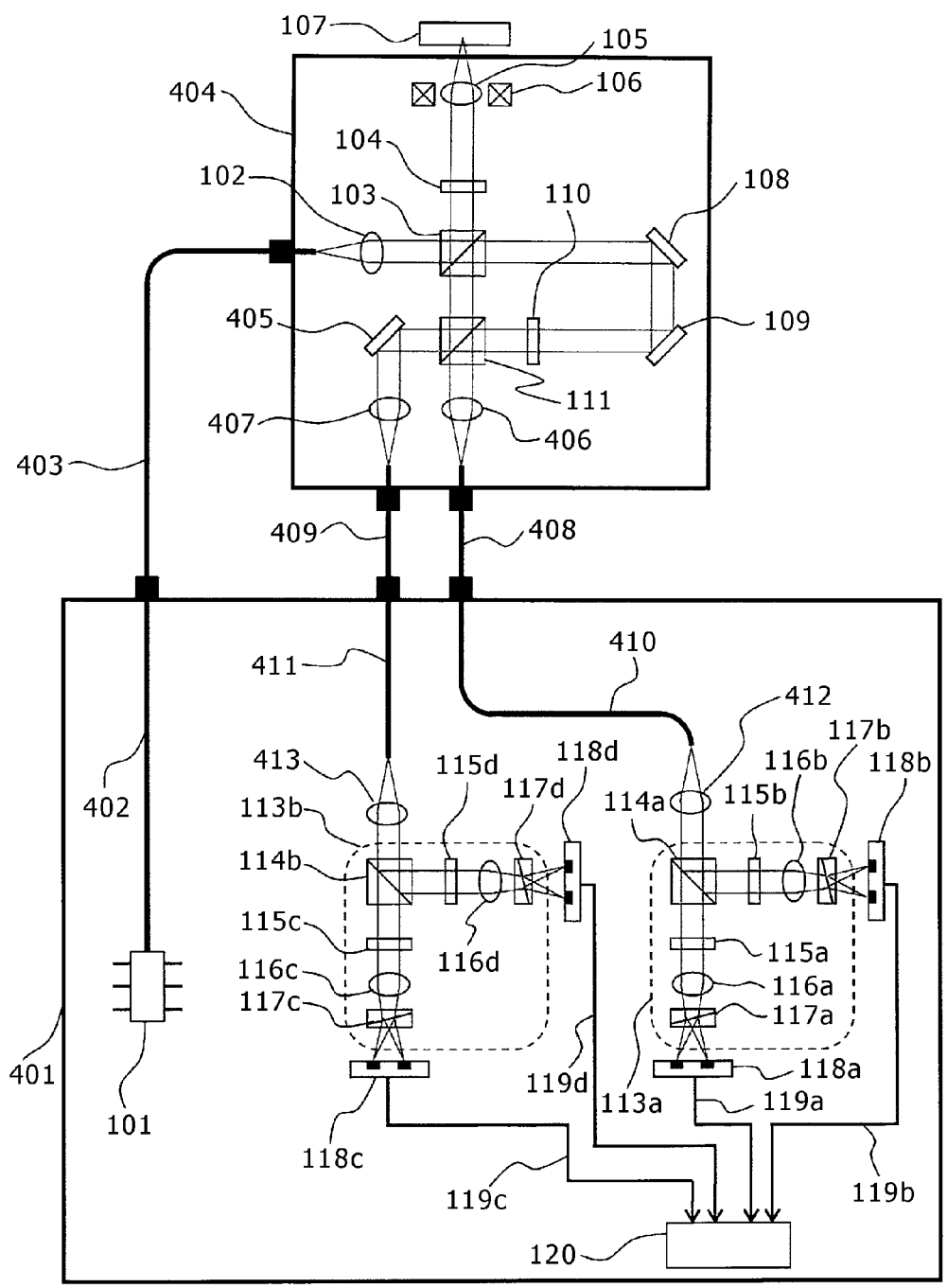
FIG. 4 shows an example of optical measurement instrument according to the invention.

FIG. 4 is a schematic diagram showing another embodiment of the invention.

This embodiment will be described below with reference to FIG. 4. The same constituent elements as the corresponding ones in FIG. 1 will be assigned respectively the same reference signs, and their description will be dispensed with.

A beam outputted from the light source 101 in an optical detection unit 401 propagates over a polarization maintaining optical fiber 402 and a polarization maintaining optical fiber 403, and is inputted to an optical observation unit 404. Here, the polarization maintaining optical fiber 403 is detachable from the optical detection unit 401 and the optical observation unit 404. The beam inputted to the optical observation unit, after being split into two by the half beam splitter 103 as in the First Embodiment, is synthesized by the polarized beam splitter 111 to generate the first synthesized beam and the second synthesized beam. The first synthesized beam and the second synthesized beam are respectively coupled to a polarization maintaining optical fiber 408 and a polarization maintaining optical fiber 409 by a focusing lens 406 and a focusing lens 407, and inputted to the optical detection unit 401. Here, the polarization maintaining optical fiber 408 and the polarization maintaining optical fiber 409 are detachable from the optical detection unit 401 and the optical observation unit 404. The first synthesized beam and the second synthesized beam inputted to the optical detection unit 401, after propagating over a polarization maintaining optical fiber 410 and a polarization maintaining optical fiber 411, are converted into parallel beams by a collimator lens 412 and a collimator lens 413, and inputted onto the first the coherence optical system 113a and the second coherence optical system 113b. The subsequent processing is exactly the same as in the First Embodiment, and accordingly its description is dispensed with.

This embodiment, as the optical detection unit 401 and the optical observation unit 404 are connected by the polarization maintaining optical fibers 403, 408 and 409, can bring only the optical observation unit 404 close to the measurement object when a large measurement object, such as a human body, is to be measured, and the measuring action is correspondingly facilitated.

Third Embodiment

Figure 5:
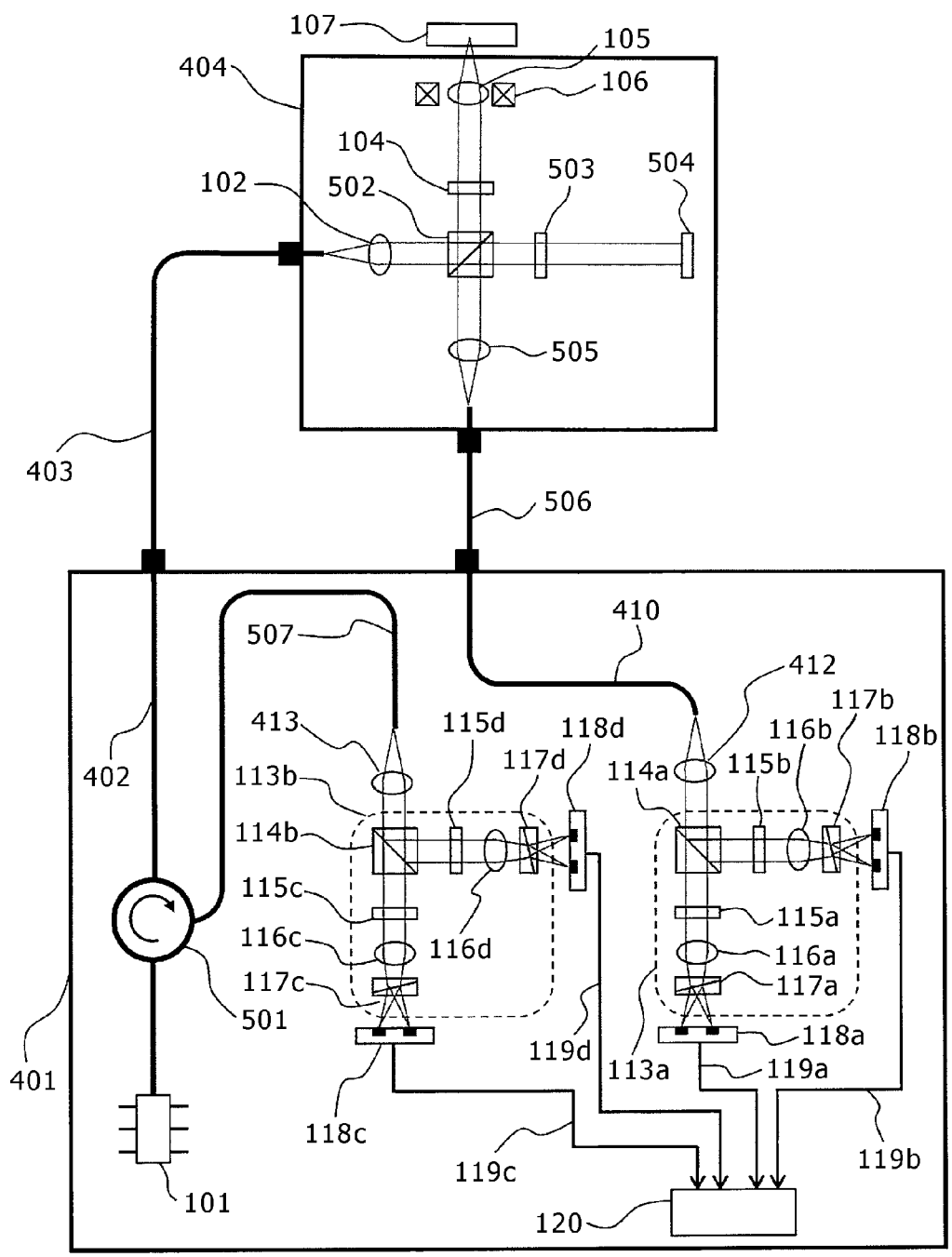
FIG. 5 shows an example of optical measurement instrument according to the invention.

FIG. 5 is a schematic diagram showing another embodiment of the invention.

This embodiment will be described below with reference to FIG. 5. The same constituent elements as the corresponding ones in FIGS. 1 through 4 will be assigned respectively the same reference signs, and their description will be dispensed with.

A beam outputted from the light source 101 in the optical detection unit 401 is guided to the polarization maintaining optical fiber 402 by an optical circulator 501 and, after propagating over the polarization maintaining optical fiber 402 and the polarization maintaining optical fiber 403, is inputted to the optical observation unit 404. The beam inputted to the optical observation unit 404, after being converted into a parallel beam by the collimator lens 102, separated into a probe beam and a reference beam by the polarized beam splitter 502. The probe beam, after being converted into a p-polarized beam or an s-polarized beam by the λ/2 plate 104, is focused by the object lens 105, and irradiates the measurement object 107. The probe beam (hereinafter referred to as signal beam) reflected by the measurement object is converted into a parallel beam by the object lens 105, and comes incident on the polarized beam splitter 502.

On the other hand, the reference beam, after being transmitted by a λ/4 plate 503 whose optical axis direction is set to about 22.5 degrees to the horizontal direction, is reflected by a mirror 504 and, after being transmitted by the λ/4 plate 503 again, comes incident on the polarized beam splitter 502. In this process, the reference beam is converted from a p-polarized beam into a 45-degree linearly polarized beam by passing the λ/4 plate twice.

The p-polarized beam component of the signal beam and the s-polarized beam component of the reference beam at the time of coming incident on the polarized beam splitter 502 are multiplexed by the polarized beam splitter 502 to become the first synthesized beam. This first synthesized beam is coupled to a polarization maintaining optical fiber 506 by a focusing lens 505, and inputted to the optical detection unit 401. Here, the polarization maintaining optical fiber 506 is detachable from the optical detection unit 401 and the optical observation unit 404.

Similarly, the p-polarized beam component of the signal beam and the s-polarized beam component of the reference beam at the time of coming incident on the polarized beam splitter 502 are multiplexed by the polarized beam splitter 502 to become the second synthesized beam. This second synthesized beam is coupled to the polarization maintaining optical fiber 403 by the collimator lens 102, and inputted to the optical detection unit 401.

The first synthesized beam inputted to the optical detection unit 401, after propagating over the polarization maintaining optical fiber 410, is converted into a parallel beam by the collimator lens 412, and comes incident on the coherence optical system 113a.

The second synthesized beam brought to incidence on the optical detection unit 401, after propagating over the polarization maintaining optical fiber 402, is guided to a polarization maintaining optical fiber 507 by the optical circulator 501, converted into a parallel beam by the collimator lens 413, and comes incident on the second coherence optical system 113b. The subsequent processing is exactly the same as in the First Embodiment, and accordingly its description is dispensed with.

In this embodiment, as the device to separate a beam from the light source into a probe beam and a reference beam, that for polarized separation of the signal beam and that for multiplexing the signal beam and the reference beam are realized with a single polarized beam splitter, the optical observation unit can be made simpler and smaller than in the Second Embodiment.

Fourth Embodiment

Figure 6:
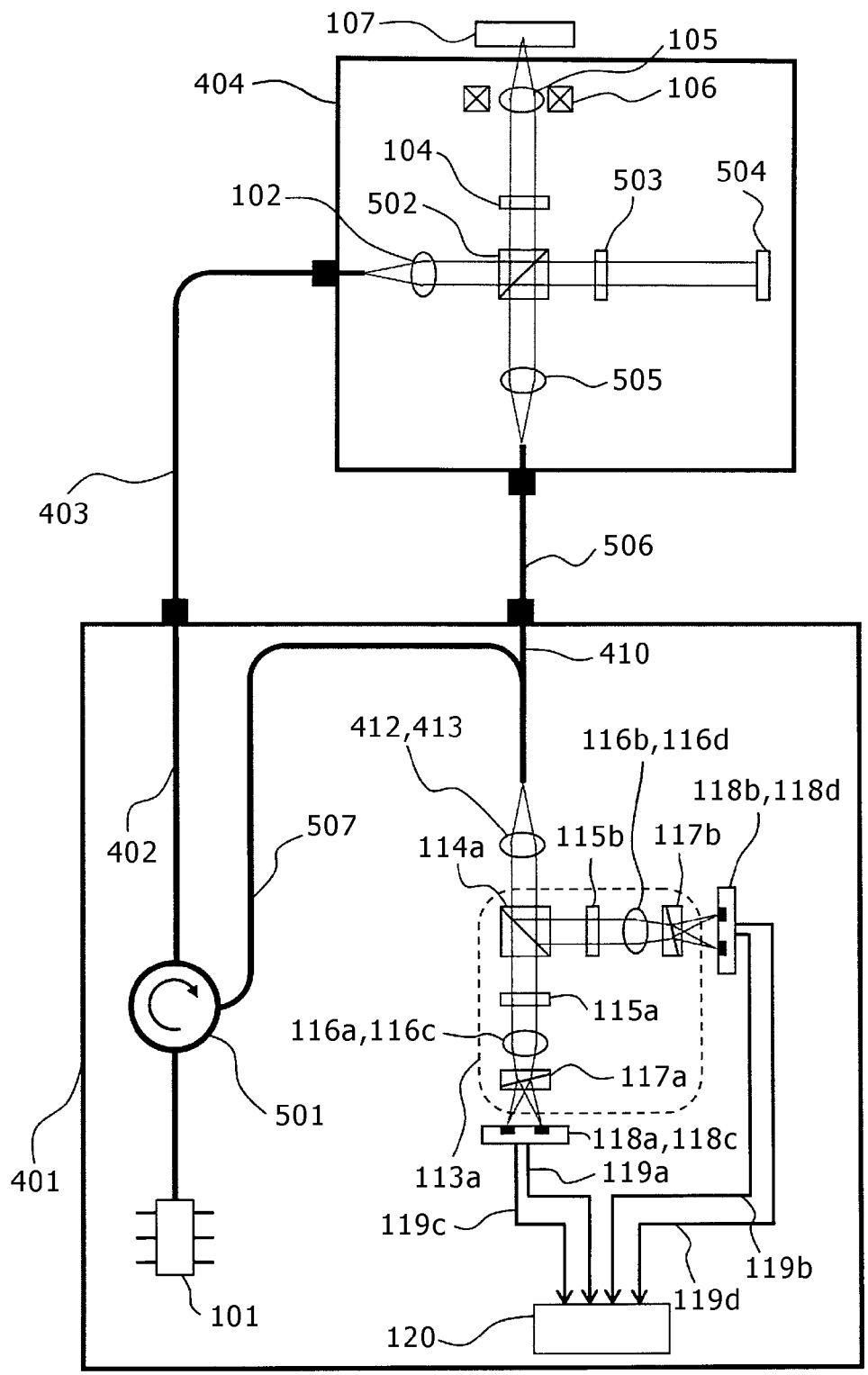
FIG. 6 shows an example of optical measurement instrument according to the invention.

FIG. 6 is a schematic diagram showing another embodiment of the invention.

This embodiment will be described below with reference to FIG. 6. The same constituent elements as the corresponding ones in FIGS. 1 through 5 will be assigned respectively the same reference signs, and their description will be dispensed with.

As in the case of the Third Embodiment, a beam generated by the light source 101 in the optical detection unit 401 is brought to incidence on the optical observation unit 404, in which a first synthesized beam and a second synthesized beam are generated. The first synthesized beam propagates over the polarization maintaining optical fiber 506, is inputted to the optical detection unit 401 and, after further propagating over the polarization maintaining optical fiber 410, comes incident on the collimator lens 412.

The second synthesized beam, after propagating over the polarization maintaining optical fiber 403 and the polarization maintaining optical fiber 402, is guided to the polarization maintaining optical fiber 507 by the optical circulator 501, and similarly comes incident on the collimator lens 413.

The first synthesized beam and the second synthesized beam coming incident on the collimator lens 412, after being converted into parallel beams, are brought to incidence on the coherence optical system 113a.

Figure 7:
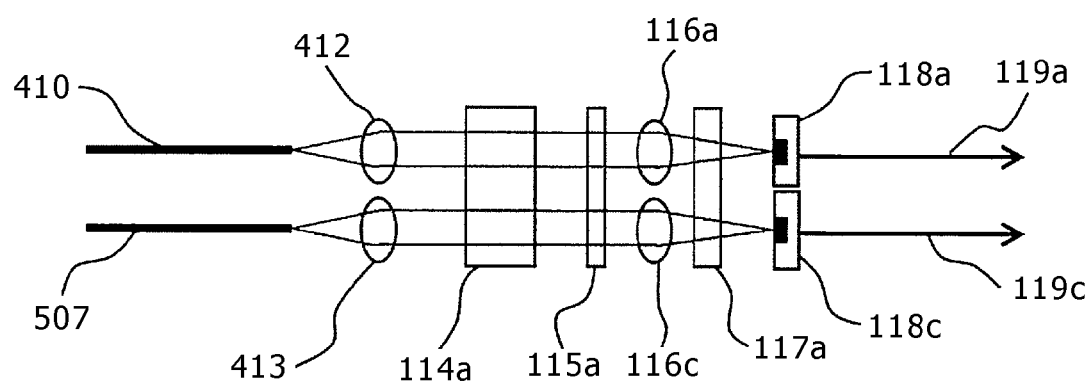
FIG. 7 is a sectional view showing an example of optical measurement instrument according to the invention.

Here, the optical axis positions of the first synthesized beam and the second synthesized beam having come incident on the coherence optical system 113a differ from each other in the height direction (a direction substantially perpendicular to the plane on which the half beam splitter 114a, the λ/2 plate 115a and the like are arranged). FIG. 7, corresponding to a sectional view of what is illustrated in FIG. 6, shows the route over which the first synthesized beam and the second synthesized beam travel from the time they are respectively emitted from the polarization maintaining optical fiber 410 and the polarization maintaining optical fiber 507 until their detection by detectors 118a an 118c. By differentiating the optical axis positions of the first synthesized beam and the second synthesized beam in the height direction in this way, the half beam splitter 114a, the λ/2 plates 115a, the λ/4 plate 115b and the Wollaston prisms 117a and 117b can be made available for shared use.

As this embodiment enables a single coherence optical system to generate coherence beams from the first synthesized beam and the second synthesized beam, it can contribute to reducing the number of components and to making the optical measurement instrument simpler and smaller in size.

Fifth Embodiment

Figure 8:
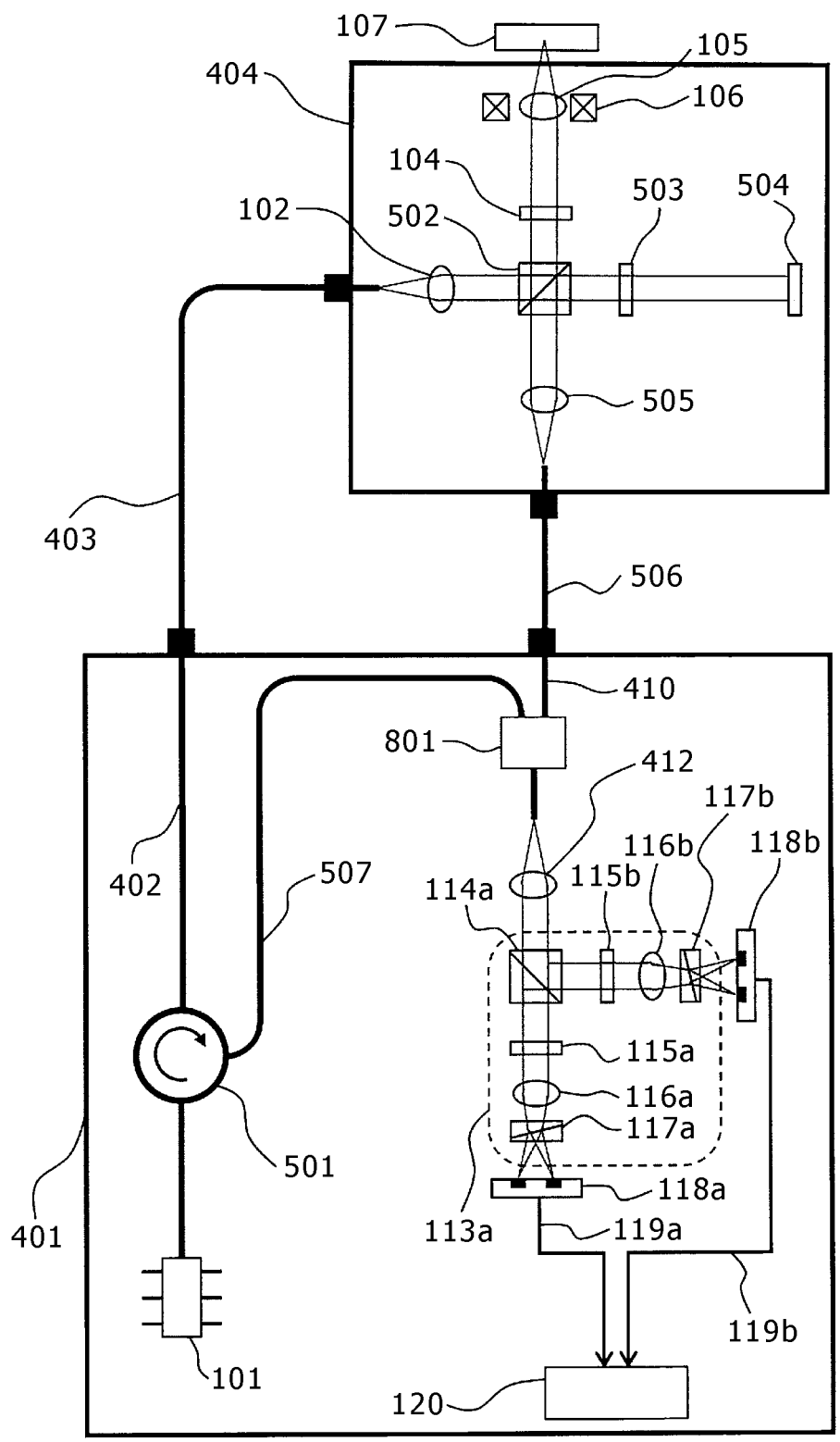
FIG. 8 shows an example of optical measurement instrument according to the invention.

FIG. 8 is a schematic diagram showing another embodiment of the invention.

This embodiment will be described below with reference to FIG. 8. The same constituent elements as the corresponding ones in FIGS. 1 through 7 will be assigned respectively the same reference signs, and their description will be dispensed with.

As in the case of the Third Embodiment, a beam generated from the light source 101 in the optical detection unit 401 is brought to incidence on the optical observation unit 404, in which the first synthesized beam and the second synthesized beam are generated. The first synthesized beam propagates over the polarization maintaining optical fiber 506 to be inputted to the optical detection unit 401 and, after further propagating over the polarization maintaining optical fiber 410, is brought to incidence on an optical switch 801.

The second synthesized beam, after propagating over the polarization maintaining optical fiber 403 and the polarization maintaining optical fiber 402, is guided to the polarization maintaining optical fiber 507 by the optical circulator 501, and brought to incidence on the optical switch 801.

The first synthesized beam and the second synthesized beam having come into incidence on the optical switch 801 are alternately emitted from the optical switch 801 at certain intervals of time and, after being converted by the collimator lens 412 into parallel beams, are brought to incidence on the coherence optical system 113a.

In this embodiment, information on each of the p-polarized beam component and the s-polarized beam component of the signal beam is alternately detected by the detector 118a and the detector 118b in accordance with the time intervals at which the optical switch 801 is changed over.

According to this embodiment, as it is made possible for one coherence optical system and a matching detecting unit to generate coherence beams from the first synthesized beam and the second synthesized beam and detect them, the number of components can be reduced and the optical measurement instrument can be made simpler and smaller in size.

To add, the present invention is not limited to the embodiments thereof described above, but covers various revised versions. For instance, the foregoing embodiments were described in detail to explain the invention in an easy-to-understand way, but are not necessarily provided with all the aspects of the configurations described above. Also, it is possible to replace part of the configuration of one embodiment with the configuration of another embodiment. Further, some parts of the configuration of each configuration can be supplemented with or replaced with other configurations, or simply deleted.

What is claimed is:

1. An optical measurement instrument comprising:
   a light source;
   an optical splitting device that splits a beam emitted from the light source into a probe beam that irradiates a measurement object and a reference beam that does not irradiate the measurement object;
   a polarization adjusting device that can adjust the polarized state of the probe beam;
   a polarized beam separating device that separates a signal beam obtained by the reflection or scattering of the probe beam by the measurement object into a first split signal beam and a second split signal beam, which are mutually orthogonal two polarized components, and that causes the first split signal beam and the reference beam to interfere with each other to generate a first and second synthesized beam;
   a first coherence optical system that generates, from the first synthesized beam, three or more coherence beams differing in phase relationship from one another;
   a second coherence optical system that generates, from the second synthesized beam, three or more coherence beams differing in phase relationship from one another;
   a first detecting device that detects the coherence beams generated by the first coherence optical system;
   a second detecting device that detects the coherence beams generated by the second coherence optical system; and
   a signal processing device that subjects signals outputted from the first detecting device and the second detecting device to arithmetic operation.

2. The optical measurement instrument according to claim 1, further comprising:
   a probe beam scanning device that scans the position of irradiation of the measurement object with the probe beam.

3. The optical measurement instrument according to claim 1,
   wherein at least either the number of coherence beams generated by the first coherence optical system or the number of coherence beams generated by the second coherence optical system is four, and
   wherein the four coherence beams generated by the first coherence optical system or the second coherence optical system differ in the phase of coherence from one another by approximately 90 degrees each, and a pair of coherence beams differing in phase by approximately 180 degrees are detected by a differential detector of a current differential type.

4. An optical measurement instrument comprising:
   a light source, an optical observation unit and an optical detection unit, wherein the optical observation unit includes:
   an optical splitting device that splits a beam emitted from the light source into a probe beam that irradiates a measurement object and a reference beam that does not irradiate the measurement object;

a polarization adjusting device that can adjust the polarized state of the probe beam;

a probe beam scanning device that scans the position of irradiation of the measurement object with the probe beam; and a polarized beam separating device that separates a signal beam obtained by the reflection or scattering of the probe beam by the measurement object into a first split signal beam and a second split signal beam, which are mutually orthogonal two polarized components, and that causes the first split signal beam and the reference beam to interfere with each other to generate a first and second synthesized beam;

wherein the optical detection unit includes:

a first coherence optical system that generates, from the first synthesized beam, three or more coherence beams differing in phase relationship from one another;

a second coherence optical system that generates, from the second synthesized beam, three or more coherence beams differing in phase relationship from one another;

a first detecting device that detects the coherence beams generated by the first coherence optical system;

a second detecting device that detects the coherence beams generated by the second coherence optical system; and a signal processing device that subjects signals outputted from the first detecting device and the second detecting device to arithmetic operation, wherein the optical observation unit and the optical detection unit being connected to each other by two or more polarization maintaining optical fibers.

5. The optical measurement instrument according to claim 1, wherein the optical splitting device and the polarization adjusting device are realized in a single polarized beam separating element; and wherein the apparatus further comprises:

a return beam utilizing device that guides the signal beam and the reference beam having returned toward the light source to the first coherence optical system or the second coherence optical system.

6. The optical measurement instrument according to claim 1, wherein the first coherence optical system and the second coherence optical system are realized in a single coherence optical system.

7. The optical measurement instrument according to claim 1, wherein the first detecting device and the second detecting device make up one and the same detecting device, and wherein an optical switch-over device that differentiates from each other the time range in which the coherence beam generated by the first coherence optical system is brought to incidence on the detecting device and the time range in which the coherence beam generated by the second coherence optical system is brought to incidence on the detecting device is further provided.

8. An optical detection unit comprising:

a light source and an optical output device that outputs outside a beam from the light source over a polarization maintaining optical fiber;

an optical input device to which a first input beam and a second beam are inputted from outside over a polarization maintaining optical fiber;

a first coherence optical system that causes the p-polarized beam component and the s-polarized beam component of the first input beam to interfere with each other to generate three or more coherence beams differing in phase relationship from one another;

a second coherence optical system that causes the p-polarized beam component and the s-polarized beam component of the second input beam to interfere with each other to generate three or more coherence beams differing in phase relationship from one another;

a first detecting device that detects the three or more coherence beams generated by the first coherence optical system;

a second detecting device that detects the three or more coherence beams generated by the second coherence optical system; and a signal processing device that subjects signals outputted from the first detecting device and the second detecting device to arithmetic operation.

9. The optical measurement instrument according to claim 8, wherein the signal processing unit subjects to arithmetic operation detection signals of the three or more coherence beams detected by the first detecting device to acquire information on the phase of the p-polarized beam component of the first input beam referencing the amplitude of the p-polarized beam component and the phase of the s-polarized beam component of the first input beam, and subjects to arithmetic operation detection signals of the three or more coherence beams detected by the second detecting unit to acquire information on the phase of the s-polarized beam of the second input beam referencing the amplitude of the s-polarized beam and the phase of the p-polarized beam component of the second input beam.

* * * * *